(12) United States Patent
Rust

(10) Patent No.: US 11,613,060 B2
(45) Date of Patent: Mar. 28, 2023

(54) PLANETARY ROLLER EXTRUDER WITH A DEGASSING SECTION

(71) Applicant: Entex Rust & Mitschke GmbH, Bochum (DE)

(72) Inventor: Harald Rust, Bochum (DE)

(73) Assignee: Entex Rust & Mitschke GmbH, Bochum (DE)

( * ) Notice: Subject to any disclaimer, the term of this patent is extended or adjusted under 35 U.S.C. 154(b) by 673 days.

(21) Appl. No.: 16/560,614

(22) Filed: Sep. 4, 2019

(65) Prior Publication Data
US 2020/0001502 A1 Jan. 2, 2020

Related U.S. Application Data

(63) Continuation-in-part of application No. PCT/EP2017/001372, filed on Nov. 24, 2017.

(30) Foreign Application Priority Data

| Mar. 5, 2017 | (DE) | 10 2017 002 029.9 |
| Apr. 12, 2017 | (DE) | 10 2017 003 598.9 |
| May 13, 2017 | (DE) | 10 2017 004 563.1 |

(51) Int. Cl.
*B29C 48/76* (2019.01)
*B29C 48/655* (2019.01)
(Continued)

(52) U.S. Cl.
CPC ............ *B29C 48/766* (2019.02); *B29B 7/485* (2013.01); *B29B 7/489* (2013.01); *B29B 7/7495* (2013.01);
(Continued)

(58) Field of Classification Search
CPC ..... B01F 7/00991; B29B 7/422; B29B 7/486; B29B 7/427; B29B 7/46; B29B 7/487;
(Continued)

(56) References Cited

U.S. PATENT DOCUMENTS

| 3,310,837 A | * | 3/1967 | Wittrock ................ B29C 45/50 366/85 |
| 4,331,718 A | | 5/1982 | Gleichechagen et al. |

(Continued)

FOREIGN PATENT DOCUMENTS

| CA | 698518 A | 11/1964 |
| DE | 1954214 U | 1/1967 |

(Continued)

OTHER PUBLICATIONS

DE-102012008169-A1 Machine translation Oct. 2013.*
English Translation of the Written Opinion of the International Searching Authority for PCT/EP2017/001372 dated Jan. 2018.*

*Primary Examiner* — Charles Cooley
(74) *Attorney, Agent, or Firm* — Smartpat PLC

(57) ABSTRACT

A planetary extruder for producing and processing polymers includes a degassing section. The extruder includes a housing and a bushing arranged therein. The bushing has an internal toothing with a pitch diameter and a root circle. An externally toothed central spindle is arranged within the housing. Planetary spindles rotate about the central spindle between the central spindle and the bushing. A heat transfer fluid is guided through fluid channels which extend helically along an outer surface of the bushing and guide the heat transfer fluid axially. A degassing opening is provided to which a negative pressure is applied for degassing. A minimum radial thickness (t) of the bushing between the root circle of the internal toothing on an inside of the bushing and a bottom of the fluid channels on an outside of the bushing is selected based on the pitch diameter (d) of the internal toothing.

18 Claims, 5 Drawing Sheets

(51) Int. Cl.
*B29C 48/44* (2019.01)
*B29C 48/285* (2019.01)
*B29B 7/48* (2006.01)
*B29B 7/74* (2006.01)
*B29B 7/84* (2006.01)
*B29C 48/435* (2019.01)
*B29C 48/25* (2019.01)
*B29C 48/68* (2019.01)
*B29C 48/685* (2019.01)
*B29C 48/80* (2019.01)
*B29C 48/875* (2019.01)

(52) U.S. Cl.
CPC ........ *B29B 7/845* (2013.01); *B29C 48/25684* (2019.02); *B29C 48/285* (2019.02); *B29C 48/288* (2019.02); *B29C 48/435* (2019.02); *B29C 48/44* (2019.02); *B29C 48/655* (2019.02); *B29C 48/683* (2019.02); *B29C 48/688* (2019.02); *B29C 48/76* (2019.02); *B29C 48/83* (2019.02); *B29C 48/765* (2019.02); *B29C 48/767* (2019.02); *B29C 48/832* (2019.02); *B29C 48/834* (2019.02); *B29C 48/875* (2019.02)

(58) Field of Classification Search
CPC ......... B29B 7/823; B29B 7/726; B29B 7/826; B29B 7/485; B29B 7/489; B29B 7/7495; B29B 7/845; B29C 48/515; B29C 48/44; B29C 48/365; B29C 48/255; B29C 48/2565; B29C 48/455; B29C 48/387; B29C 48/507; B29C 48/85; B29C 48/84; B29C 48/285; B29C 48/425; B29C 48/435; B29C 48/2561; B29C 48/39; B29C 48/29; B29C 48/43; B29C 48/766; B29C 48/25684; B29C 48/288; B29C 48/655; B29C 48/683; B29C 48/688; B29C 48/76; B29C 48/83; B29C 48/765; B29C 48/767; B29C 48/832; B29C 48/834; B29C 48/875
See application file for complete search history.

(56) References Cited

U.S. PATENT DOCUMENTS

| | | | |
|---|---|---|---|
| 4,889,430 A * | 12/1989 | Mueller | B29B 7/487 366/85 |
| 5,021,297 A | 6/1991 | Rhue et al. | |
| 5,447,669 A | 9/1995 | Bortnick et al. | |
| 5,530,080 A | 6/1996 | Siol et al. | |
| 5,721,289 A | 2/1998 | Karim et al. | |
| 5,789,487 A | 8/1998 | Matyjaszewski et al. | |
| 5,854,364 A | 12/1998 | Senninger et al. | |
| 5,945,491 A | 8/1999 | Matyjaszewski et al. | |
| 5,967,919 A | 10/1999 | Bakker | |
| 5,968,429 A | 10/1999 | Treece et al. | |
| 5,980,797 A | 11/1999 | Shelby et al. | |
| 6,074,084 A * | 6/2000 | Kolossow | B29B 7/7414 366/144 |
| 6,114,461 A | 9/2000 | Preti et al. | |
| 6,150,017 A | 11/2000 | Burmeister et al. | |
| 6,214,942 B1 | 4/2001 | Siol et al. | |
| 6,362,269 B1 | 3/2002 | Ishihata et al. | |
| 6,506,447 B1 | 1/2003 | Hirsch et al. | |
| 6,720,399 B2 | 4/2004 | Husemann et al. | |
| 6,765,078 B2 | 7/2004 | Husemann et al. | |
| 6,780,271 B1 | 8/2004 | Burmeister et al. | |
| 6,977,239 B1 | 12/2005 | Weuthen et al. | |
| 7,049,279 B1 | 5/2006 | Weuthen et al. | |
| 7,476,416 B2 | 1/2009 | Tynan et al. | |
| 8,293,158 B2 | 10/2012 | Rust et al. | |
| 8,957,119 B2 | 2/2015 | Rust | |
| 9,193,106 B2 | 11/2015 | Rust et al. | |
| 9,926,426 B2 | 3/2018 | Rust | |
| 10,112,320 B2 | 10/2018 | Rust | |
| 10,112,336 B2 | 10/2018 | Rust | |
| 10,131,760 B2 | 11/2018 | Rust | |
| 11,446,617 B2 * | 9/2022 | Rust | B29C 48/2565 |
| 11,485,298 B2 * | 11/2022 | Rust | B29B 7/487 |
| 2003/0012077 A1 * | 1/2003 | Behling | B29C 48/683 366/85 |
| 2003/0015814 A1 | 1/2003 | Krull et al. | |
| 2003/0022809 A1 | 1/2003 | Weuthen et al. | |
| 2003/0027741 A1 | 2/2003 | Weuthen et al. | |
| 2003/0114582 A1 | 6/2003 | Husemann et al. | |
| 2003/0129390 A1 | 7/2003 | Husemann et al. | |
| 2003/0144172 A1 | 7/2003 | Weuthen et al. | |
| 2004/0092685 A1 | 5/2004 | Husemann et al. | |
| 2004/0249046 A1 | 12/2004 | Abhari et al. | |
| 2005/0001348 A1 | 1/2005 | Kohnen et al. | |
| 2005/0272839 A1 | 12/2005 | Bauer et al. | |
| 2006/0029760 A1 | 2/2006 | Kreft et al. | |
| 2006/0052472 A1 | 3/2006 | Hansen et al. | |
| 2006/0079709 A1 | 4/2006 | Gurtler et al. | |
| 2006/0084734 A1 | 4/2006 | Bauer et al. | |
| 2007/0055017 A1 | 3/2007 | Schultes et al. | |
| 2007/0055032 A1 | 3/2007 | Langenbuch et al. | |
| 2007/0161746 A1 | 7/2007 | Weber | |
| 2007/0173622 A1 | 7/2007 | Tynan et al. | |
| 2008/0087572 A1 | 4/2008 | Wihren | |
| 2008/0118751 A1 | 5/2008 | Zollner et al. | |
| 2008/0269415 A1 | 10/2008 | Spyrou et al. | |
| 2009/0023851 A1 | 1/2009 | Bierdel et al. | |
| 2009/0048398 A1 | 2/2009 | Zollner et al. | |
| 2009/0221744 A1 | 9/2009 | Thormeier et al. | |
| 2009/0236766 A1 * | 9/2009 | Rust | B29B 7/485 264/141 |
| 2009/0274859 A1 | 11/2009 | Husemann et al. | |
| 2009/0286950 A1 | 11/2009 | Schumann et al. | |
| 2010/0104864 A1 | 4/2010 | Zöllner et al. | |
| 2010/0127062 A1 | 5/2010 | Rodewald | |
| 2011/0104488 A1 | 5/2011 | Müssig et al. | |
| 2011/0143033 A1 | 6/2011 | Iijima et al. | |
| 2013/0059139 A1 | 3/2013 | Ackermann et al. | |
| 2013/0093114 A1 * | 4/2013 | Rust | B29C 48/435 264/211.23 |
| 2013/0156646 A1 | 6/2013 | Bernhard | |
| 2014/0057091 A1 | 2/2014 | Krawinkel et al. | |
| 2014/0096681 A1 | 4/2014 | Buse | |
| 2014/0110465 A1 | 4/2014 | Krause et al. | |
| 2014/0203018 A1 | 7/2014 | Kerep | |
| 2014/0248584 A1 | 9/2014 | Wolter et al. | |
| 2014/0335338 A1 | 11/2014 | Burmeister et al. | |
| 2014/0366731 A1 | 12/2014 | Nougayrede et al. | |
| 2015/0043300 A1 * | 2/2015 | Rust | B29B 7/72 366/75 |
| 2015/0118352 A1 * | 4/2015 | Visscher | B29C 48/04 366/83 |
| 2015/0150257 A1 | 6/2015 | Soergel et al. | |
| 2015/0159536 A1 | 6/2015 | Hodgson et al. | |
| 2015/0175445 A1 | 6/2015 | Balidas et al. | |
| 2015/0249616 A1 | 9/2015 | Lee et al. | |
| 2015/0283728 A1 * | 10/2015 | Rust | B29B 7/421 366/81 |
| 2015/0336078 A1 | 11/2015 | Hamers et al. | |
| 2016/0002468 A1 | 1/2016 | Heikkila et al. | |
| 2016/0067398 A1 | 3/2016 | Koch | |
| 2016/0083549 A1 | 3/2016 | Zmarsly et al. | |
| 2016/0243744 A1 | 8/2016 | Gneuss et al. | |
| 2016/0304632 A1 | 10/2016 | Köhler et al. | |
| 2016/0326413 A1 | 11/2016 | Schuh et al. | |
| 2017/0002236 A1 | 1/2017 | Papenbroock et al. | |
| 2017/0121568 A1 | 5/2017 | Strebl et al. | |
| 2017/0320010 A1 | 11/2017 | Eisch et al. | |
| 2018/0126597 A1 | 5/2018 | Rust | |
| 2018/0126623 A1 | 5/2018 | Rust | |
| 2018/0251624 A1 * | 9/2018 | Rust | B29B 7/845 |
| 2018/0281263 A1 | 10/2018 | Rust | |

(56) References Cited

U.S. PATENT DOCUMENTS

| | | | |
|---|---|---|---|
| 2019/0263044 A1* | 8/2019 | Rust | B29B 7/826 |
| 2019/0329450 A1* | 10/2019 | Rust | B29C 48/435 |
| 2020/0001502 A1* | 1/2020 | Rust | B29B 7/489 |

FOREIGN PATENT DOCUMENTS

| | | |
|---|---|---|
| DE | 2845541 B1 | 6/1980 |
| DE | 3725641 A1 | 2/1989 |
| DE | 3908415 A1 | 9/1990 |
| DE | 68912741 | 5/1994 |
| DE | 4340136 A1 | 6/1995 |
| DE | 4340887 A1 | 6/1995 |
| DE | 19548136 A1 | 6/1997 |
| DE | 19609715 A1 | 9/1997 |
| DE | 19638094 A1 | 3/1998 |
| DE | 19653790 A1 | 6/1998 |
| DE | 69225962 | 10/1998 |
| DE | 19806609 A1 | 8/1999 |
| DE | 19815120 A1 | 10/1999 |
| DE | 69422704 | 2/2000 |
| DE | 19856235 A1 | 5/2000 |
| DE | 19939075 A1 | 2/2001 |
| DE | 19939077 A1 | 2/2001 |
| DE | 19953793 A1 | 5/2001 |
| DE | 19953796 A1 | 5/2001 |
| DE | 19956802 A1 | 6/2001 |
| DE | 19956803 A1 | 6/2001 |
| DE | 19958398 A1 | 6/2001 |
| DE | 19960494 A1 | 6/2001 |
| DE | 69521056 | 6/2001 |
| DE | 19962859 A1 | 7/2001 |
| DE | 19962883 A1 | 7/2001 |
| DE | 19962886 A1 | 7/2001 |
| DE | 69614012 | 8/2001 |
| DE | 10029553 A1 | 1/2002 |
| DE | 10048028 A1 | 4/2002 |
| DE | 69806358 | 3/2003 |
| DE | 10156088 A1 | 6/2003 |
| DE | 10354172 A1 | 6/2005 |
| DE | 102004048440 A1 | 6/2005 |
| DE | 102004048794 A1 | 6/2005 |
| DE | 102004002159 A1 | 8/2005 |
| DE | 102004004230 A1 | 8/2005 |
| DE | 102005007952 A1 | 9/2005 |
| DE | 69922626 | 12/2005 |
| DE | 102004023085 A1 | 12/2005 |
| DE | 102004026799 A1 | 12/2005 |
| DE | 102004032694 A1 | 2/2006 |
| DE | 102004038774 A1 | 2/2006 |
| DE | 102004044085 A1 | 3/2006 |
| DE | 102004044086 A1 | 3/2006 |
| DE | 102004046228 A1 | 3/2006 |
| DE | 102004048773 A1 | 4/2006 |
| DE | 102004048875 A1 | 4/2006 |
| DE | 102004038967 | 5/2006 |
| DE | 69832493 | 6/2006 |
| DE | 102004061068 A1 | 7/2006 |
| DE | 102006001171 A1 | 4/2007 |
| DE | 102006002176 A1 | 7/2007 |
| DE | 102006033089 A1 | 10/2007 |
| DE | 10054854 | 1/2008 |
| DE | 102004034039 B4 | 4/2008 |
| DE | 102006043259 A1 | 6/2008 |
| DE | 112005000058 | 7/2008 |
| DE | 102007050466 A1 | 4/2009 |
| DE | 112007002171 T5 | 8/2009 |
| DE | 102008012185 A1 | 9/2009 |
| DE | 112007002445 | 9/2009 |
| DE | 102008001431 A1 | 10/2009 |
| DE | 102008019804 A1 | 10/2009 |
| DE | 102009009775 A1 | 1/2010 |
| DE | 102008058537 A1 | 5/2010 |
| DE | 10066229 | 9/2010 |
| DE | 102009046362 A1 | 5/2011 |
| DE | 112009001885 T5 | 5/2011 |
| DE | 102009059912 A1 | 6/2011 |
| DE | 102010026535 A1 | 1/2012 |
| DE | 102010038288 A1 | 1/2012 |
| DE | 202010017571 U1 | 2/2012 |
| DE | 202010017570 U1 | 3/2012 |
| DE | 112005002824 B4 | 5/2012 |
| DE | 102011007425 A1 | 10/2012 |
| DE | 102011050314 A1 | 11/2012 |
| DE | 102011075313 A1 | 11/2012 |
| DE | 102011076257 A1 | 11/2012 |
| DE | 102011076993 A1 | 12/2012 |
| DE | 102011102923 A1 | 12/2012 |
| DE | 102011011202 B4 | 3/2013 |
| DE | 102011082441 A1 | 3/2013 |
| DE | 102011089331 A1 | 3/2013 |
| DE | 102011083988 A1 | 4/2013 |
| DE | 102012202005 A1 | 4/2013 |
| DE | 102011088959 A1 | 6/2013 |
| DE | 102012005450 B4 | 7/2013 |
| DE | 102012100710 A1 | 8/2013 |
| DE | 102013101997 A1 | 9/2013 |
| DE | 102012006169 A1 | 10/2013 |
| DE | 102012008169 A1 | 10/2013 |
| DE | 102012008170 A1 | 10/2013 |
| DE | 102012008170 A1 * | 10/2013 |
| DE | 102012207801 A1 | 11/2013 |
| DE | 102012208778 A1 | 11/2013 |
| DE | 102012107430 A1 | 2/2014 |
| DE | 102012212675 A1 | 2/2014 |
| DE | 102012217383 A1 | 3/2014 |
| DE | 102012019908 A1 | 4/2014 |
| DE | 102012020011 A1 | 4/2014 |
| DE | 102013000708 A1 | 4/2014 |
| DE | 102013007132 A1 | 4/2014 |
| DE | 102012022346 A1 | 5/2014 |
| DE | 102012212883 A1 | 5/2014 |
| DE | 102013000596 A1 | 7/2014 |
| DE | 102013204312 A1 | 9/2014 |
| DE | 102013006667 A1 | 10/2014 |
| DE | 102013108369 A1 | 10/2014 |
| DE | 102013208445 A1 | 11/2014 |
| DE | 102013017927 A1 | 4/2015 |
| DE | 102013224774 A1 | 6/2015 |
| DE | 102013225178 A1 | 6/2015 |
| DE | 102011112081 A1 | 8/2015 |
| DE | 112014001304 | 1/2016 |
| DE | 202016101935 U1 | 4/2016 |
| DE | 102014016380 A1 | 5/2016 |
| DE | 102015001167 A1 | 8/2016 |
| DE | 102015217860 A1 | 11/2016 |
| EP | 0080665 A2 | 6/1983 |
| EP | 0854178 A1 | 7/1998 |
| EP | 1056584 A1 | 12/2000 |
| EP | 1077091 A2 | 2/2001 |
| EP | 1078968 A1 | 2/2001 |
| EP | 1067352 B1 | 8/2003 |
| EP | 1311555 B1 | 3/2005 |
| EP | 1844917 A2 | 10/2007 |
| EP | 1978069 A1 | 10/2008 |
| EP | 1791922 B1 | 12/2008 |
| EP | 2801461 A2 | 11/2014 |
| JP | H09326731 A | 12/1997 |
| JP | H10235713 A | 9/1998 |
| JP | H1180690 A | 3/1999 |
| JP | H11216754 A | 8/1999 |
| JP | H11216764 A | 8/1999 |
| WO | 9411175 A1 | 5/1994 |
| WO | 9942276 A1 | 8/1999 |
| WO | 0050504 A1 | 8/2000 |
| WO | 0118148 A1 | 3/2001 |
| WO | 03020823 A1 | 3/2003 |
| WO | 2004037941 A2 | 5/2004 |
| WO | 2004101626 A1 | 11/2004 |
| WO | 2004101627 A1 | 11/2004 |
| WO | 2005042639 A1 | 5/2005 |
| WO | 2005047391 A1 | 5/2005 |
| WO | 2006108744 A1 | 10/2006 |
| WO | 2007087465 A2 | 8/2007 |
| WO | 2009000408 A1 | 12/2008 |

(56) References Cited

FOREIGN PATENT DOCUMENTS

| | | |
|---|---|---|
| WO | 2009090119 A1 | 7/2009 |
| WO | 2009138402 A1 | 11/2009 |
| WO | 2013037685 A1 | 3/2013 |
| WO | 2013159801 A1 | 10/2013 |
| WO | 2013189801 A1 | 12/2013 |
| WO | 2014061997 A1 | 4/2014 |
| WO | 2015189326 A1 | 12/2015 |
| WO | 2016124310 A1 | 8/2016 |
| WO | 2017001048 A1 | 1/2017 |
| WO | 2018188716 A1 | 10/2018 |
| WO | 2018192677 A1 | 10/2018 |
| WO | 2019011461 A1 | 1/2019 |

* cited by examiner

PLANETARY ROLLER EXTRUDER WITH A DEGASSING SECTION

CROSS REFERENCE TO RELATED APPLICATIONS

This application is a continuation in part of international patent application PCT/EP2017/001372 filed Nov. 24, 2017, which claims priority to German patent applications DE102017004563 filed May 13, 2017, DE102017002029.9 filed Mar. 5, 2017, and DE102017003598.9 filed Apr. 12, 2017.

TECHNICAL FIELD

The present invention generally relates to an extruder for producing and processing polymers and polymer mixtures, and more particularly, to a planetary roller extruder with a degassing section.

BACKGROUND

Extruders are often used for processing materials, in particular plastics, which are at least partially in a molten state or can be brought into a molten state. These materials are often polymers, copolymers and elastomers. In the extruder, materials of all kinds can be processed, including solids with molten materials, including polymer blends, and copolymer blends, even elastomers, also in blends with other additional substances, including gases.

For example, these materials are: Acrylonitrile (ABAK), acrylonitrile/butadiene/styrene (ABS), ABS with polycarbonate (ABS+PC), acrylate rubber (ACM), ethylene acrylic ester rubber (AEPCMS), acrylonitrile/ethylene-propylene diene/styrene (AES), nitrous rubber (AFMU), acrylic nitrile metacrylate (AMAK), acrylonitrile/methyl methacrylate (AMMA), acrylonitrile/butadiene/acrylate (ANBA), acrylonitrile/methacrylate (ANMA), aromatic polyesters (APE), acrylonitrile/chlorinated polyethylene/styrene (APE-CS), acrylonitrile/styrene/acrylic ester (ASA), TPE, based aliphatic polyurethane (ATPU) urethane rubber, polyester (AU), benzyl cellulose (BC) butadiene rubber (BR), cellulose acetate (CA), cellulose acetobutyrate (CAB), cellulose acetopropionate (CAP), cresol formaldehyde (CF), hydrated cellulose, cellophane (CSH), chlorinated PE rubber (CM), carboxymethyl cellulose (CMC), cellulose nitrate, celluloid/CN), epichlorohydrin rubber (CO), cyclopolyolefin polymers, Topas (COC), cellulose propionate (CPL), chloroprene rubber (CR), casein plastics (CS), casein formaldehyde, synthetic horn (CSF), chlorosulfonated PE (rubber) (CSM), cellulose triacetate (ICTA), dicyclopentadiene (DCP), ethylene/methacrylic acid (EAA), ethylene vinyl acetate rubber (EAM), ethylene/butyl acrylate (EBA), ethyl cellulose (EC), ethylene copolymer bitumen blend (ECB), epichlorohydrin rubber (ECD), ethylene/chlorotrifluoroethylene (ECTFE), ethylene/ethyl acrylate (EEA), polyethylene ionomers (EIM), ethylene/methacrylic acid (EMAK), exo-methylenelaton (EML), ethylidene norbornenes (EN), ethylene acrylonitrile rubber (ENM), epoxidized natural rubber (ENR), ethylene/propylene (ENR) EP), epoxy resins, polyaddition resins (EP), ethylene/propylene/ (diene) rubbers (EP( ) M, epichlorohydrin rubber (ETER), ethylene/tetrafluoroethylene (ETFE), urethane rubber, polyethers (EU), ethylene/vinyl acetate (EVA), ethylene/vinyl alcohol, EVOH (EVAL), TPE, basic ethylene/vinyl acetate+polyvinylidene chloride (EVAPVDC), Ethylene/vinyl alcohol, EVAL (EVOH), tetrafluoroethylene/hexafluoropropylene (FEP), furan/formaldehyde (FF), perfluor rubber (FFKM), fluororubber (FKM), propylene/tetrafluoroethylene rubber (FPM), phosphazene rubber with fluoralkyl or fluoroalkyl groups (FZ), propylene oxide rubber (GPO), halogenated butyl rubber (HIIR), hydrogenated NBR rubber (HNBR), higher alpha olefins (HOA), pyrones, polycyclones, ladder polymers (HAT-P), polycyclones, ladder polymers (HT-PP), polytriazines, ladder polymers (HAT-PT), butyl rubber (CIIR, BIIR) (IIR), isoprene rubber (IR), hydrocarbon resin (KWH), liquid christal polymers (LCP), methyl methacrylate/acrylonitrile/butadiene/styrene (MABS), methacrylate/butadiene/styrene (MBS), methylcellulose (MC), melamine/formaldehyde (MF), melamine/U-formaldehyde+unsaturated polyester (MF+UP), melamine/phenol-formaldehyde (MPF), methyl/phenyl/silicone rubber (MPQ), methyl methacrylate/exo-methylene lactone (MMAEML), melamine/phenol-formaldehyde (MPF), methyl/silicone rubber (MQ), alpha-methylstyrene (MS), melamine/urea/formaldehyde (MUF), melamine/urea/phenol/formaldehyde (MVFQ), polyacrylonitrile (PAN), polybutene-I (PB), polybutyl acrylate (PBA), polybenzimidazole, triazine polymer (PBI), polybismaleimide (PBMI), polybutylene naphthalate (PBN), polyoxadabenzimidazole (PBO), polybutylene terephthalate (PBT), polycarbonate (PC) with ABS or AES, ASA, or PBT or PE-HD or PEET or PMMA or PS or PPE or SB or HI or SMA or TPU or BPA, or TMBPA or TMC, poly-3,3-bis-chloromethylpropyleneoxide (PCPO), polycyclohexanedimethyl terephthalate (PCT), polychlorotrifluoroethylene (PCTFE), poly-diallylphthalate (PDAP), polydicyclopentadiene (PDCPD), polyethylene (PE), polyester amide (PEA), polyester carbonate (PEC), polyether ketone (PEK), polyethylene naphthalate (PEN), polythylene oxide (PEOX), polyethersulfones (PES), polyesterimide (PEST), polyethylene terephthalate (PET) with elastomer or with MBS or PBT or PMMA or Pmma or PSU, phenol/formaldehyde (PF), phenol/formaldehyde+epoxide (PF+EP), PTFE/perfluoroalkyl vinyl ether, perfluoroalkoxy (PFA), phenol/formaldehyde/melamine (PFMF), polyperfluorotrimethyltriazine rubber (PFMT), PTFE copolymer (PFTEAF), polyhydroxyalkaline (PHA), polyhydroxybenzoate (PHBA), polyamide imides (PI), polyisobutylene (PIB), polyimide sulfone (PISO), aliphatic polyketone (PK), polylactide (PLA), polymethylacrylate (PMA), polymethacrylimide (PMI), polymethyl methacrylate (PMMA), polyacrylic ester imide (PMMI), poly-4 methylpentene-1 (PMP), poly-alpha-methylstyrene (PMS), fluor/phosphazene rubber (PNF), polynorbornene rubber (PNR), polyolefins, polyolefin derivatives and polyolefin copolymers (PO), poly-p-hydroxy benzoate (POB), polyoxymethylene (polyacetal resin, polyformaldehyde) (POM), POM with PUR elastomer or homopolymer or copolymer, polyphthalate (PP), PP-carbonate, PP with block copolymers or chlorinated or made with homopolymer or with metallocene, polyamide (PPA), polyphenylene ether (PPE), PPE with PA or with PB T or with PS, polydphenyloxidepyrronellithimide U (PPI), polyparamethylstyrene (PPMS), polyphenylene oxide (PPO), polypropylene oxide (PPDX), poly-p-phenylene (PPP), polyphenylene sulfide (PPS), polyphenylene sulfone (PPSU), poly-m-phenylene/terephthalamide (PPTA), polyphenyl vinyl (PPV), polypyrrole (PPY), polystyrene (PS), PS with PC or PE or PPE, polysaccharides (PSAC), polysulfones (PSU), polytetrafluoroethylene (PTFE), polytetrahydrofuran (PTHF), polybutylene terephthalate (PTMT), polyester (PTP), polytrimethylterephthalate (PTT), polyurethane (PUR), polyvinyl acetate (PVAC), polyvinyl alcohol (PVAL), polyvinyl butyral (PVB), polyvinyl isobutylether (PVBE), polyvinyl chloride (PVC).

Polyvinylidene chloride (PVDC), polyvinylidene fluoride (PVDF), polyvinyl fluoride (PVF), polyvinylformal (PVFM), polyvinyl carbazole (PVK), polyvinyl methylether (PVME), polyvinyl cyclohexane (PVZH), phosphazene/rubber with phenolic groups (PZ), resorcinol/formaldehyde (RF, styrene/acrylonitrile (SAN), styrene/butadiene (SB), styrene/butadiene/methyl methacrylate (SBMMA), styrene/butadiene rubber (SBR), styrene/butadiene/styrene (SBS), styrene-ethene butene/styrene (SEBS), styrene/ethylene/propylene/diene rubber (SEPDM), silicone (SI), styrene/isoprene/maleic anhydride (SIMA), isoprene/styrene rubber (SIR), styrene/isoprene/styrene (SIS), styrene/maleic anhydride (SAM), styrene/maleic anhydride/butadiene (SAAB), styrene/methyl methacrylate (SMMA), styrene alpha-methylstyrene (SMS), polyester (SP), thiocarbonyl difluoride copolymer rubber (TCF), TPE with EPDM+PP or PBBS+PP, TPE with PEBBS+PPE or PEBS+PP or with PESST or PESTRUR or with PESTEST or with PESTUR or with PEUR or with SBS+PP, thermoplastic elastomers (TPE), thermoplastic starch (TPS), urea/formaldehyde (UF), vinyl chloride (VC), vinyl chloride/ethylene (VCE), vinyl chloride/maleic anhydride (VCMA), vinyl ester (VE).

The selected materials are also able to
reinforce effects,
add additional effects, for example, increase the heat resistance or wear resistance or increase the acid resistance or increase UV resistance or strength or resilience, or cause cross-linking of the molecules or cause a reaction of the polymers or cause discoloration of the polymers or increase the color fastness of polymers or change the melting point or facilitate the dispersion and homogenization or cause foaming or facilitate foaming or facilitate the extrusion or change the friction values, or
be fillers.

The extruders can perform various tasks during extrusion. These tasks include e.g.
mixing with other materials and/or
reaction with other materials and/or
transformation of the materials and/or
separation of volatile components by degassing In addition to the polymers, various other materials are used for extrusion. These include fillers, coloring agents, plasticizers, stabilizers and other additives and auxiliary constituents. All substances are referred to below as feedstocks. Feedstocks exist in solid form or in liquid form.

When using the extruders for polymerization, monomers are combined with polymerisation agents.

The extruder can also be used to induce other reactions. This applies both to the creation of new, e.g. larger molecules and to breaking of molecules.

Different polymers and their processing in an extruder are described e.g. in the following publications: DE112014001304T, DE102013224774, DE102012212883, DE69922626T, DE69832493T, DE69806358T, DE69614012T, DE69521056T, DE69422704T, DE69225962T, DE68912741T, DE19609715, DE10156088, DE10029553, DE4340887, DE4340136.

Extruders are divided into the following main groups: Single-screw extruders, twin-screw extruders, and planetary roller extruders.

Single-screw extruders consist of a rotating screw and a surrounding housing. Single screws achieve a high pressure build-up and a large conveyor effect. However, homogenization and dispersion in single-screw extruders are weak. Still, single-screw extruders are still the most widely used extruders.

Twin-screw extruders consist of two parallel and intermeshing screws and a surrounding housing. Twin screws also achieve a high pressure build-up and a high conveyor effect. The mixing efficiency of twin-screw extruders is much higher than with single-screw extruders. However, due to the mechanical stress in the twin-screw extruder, the polymers undergo a more or less huge change in their molecular chains. There are applications that can handle this. For other applications, it is important to maintain the molecular chains. There are also applications in which targeted breaking of molecular chains is desired.

The planetary roller extruder is perfect for gentle processing of polymers. It is surprising that molecular chains can also be broken up with a planetary roller extruder.

Planetary roller extruders include of several parts. These are:
a rotating central spindle
a housing surrounding the central spindle at a distance, including an internal toothing, and
planetary spindles that rotate like planets around the central spindle in the cavity between the central spindle and internally toothed housing.

As far as is spoken below of an internal toothing of the housing, this also includes a multi-part housing with a bushing, forming the internal toothing of the housing.

In the planetary roller extruder, the planetary spindles mesh with both the central spindle and the internally toothed housing. At the same time, the ends of the planetary spindles pointing in the conveying direction slide on a thrust ring. Compared to all other extruder types, the planetary roller extruders provide an extremely good mixing efficiency but a lower conveying effect.

For the continuous preparation or processing of polymers, the use of planetary roller extruders has been known for some decades. Such methods and the corresponding planetary roller extruders are described in particular in the following publications: DE202016101935U, DE19939075, CA698518, DE19653790, DE19638094, DE19548136, DE1954214, DE3908415, DE19939077, EP1078968, EP1067352, EP0854178, JP3017176B, JPH11216754, JPH11216764, JPH10235713, WO2007087465, WO2004101627, WO2004101626, WO2004037941, EP1056584, WO9942276, WO9411175, U.S. Pat. Nos. 6,780,271, 7,476,416.

It is referred to as planetary roller extruder sections/modules if an extruder consists of several sections/modules. The term "section" implies a length which is matched to the relevant processing section in the extruder. The term "module", however, indicates uniform lengths. Despite the uniform length, longer processing lines can also be represented. Different modules are then put together.

In most cases, different processing steps take place in the sections/modules. For years, it has proven to be beneficial to combine planetary roller extruder sections/modules with other types of sections/modules. In particular, planetary roller extruder sections/modules can be combined with a filling section designed as a single-screw extruder section/module. Through the filling section, the feedstocks for the extrusion are removed from a hopper and pressed into the downstream planetary roller extruder sections/modules for processing.

As far as liquid propellants or other liquid substances are to be entered into the planetary roller extruder sections/modules, it has proven useful to inject these fluids via injection rings into the system; these rings are arranged each between two planetary roller extruder sections/modules.

It is also known to feed melt via a side-arm extruder or a pump directly into a planetary roller extruder section/module.

For details and variations of known planetary roller extruders or sections/modules, reference is made to the following publications: DE 102005007952, DE102004061068, DE102004048875, DE102004048794, DE102004048773, DE102004048440, DE102004046228, DE102004044086, DE102004044085, DE102004038774, DE102004034039, DE102004032694, DE102004026799, DE102004023085, DE102004004230, DE102004002159, DE19962886, DE19962883, DE19962859, DE19960494, DE19958398, DE19956803, DE19956802, DE19953796, DE19953793.

Extruders may include e.g.: a filling zone, a melting zone, a mixing zone/dispersing zone/homogenizing zone and a discharge zone. The discharge zone may include cooling and discharge. However, cooling and discharge can also be considered as separate zones. There are also other zones.

We speak of a degassing zone if volatile constituents are to be removed from the molten or plasticized extrusion material. The volatile constituents may include air which is introduced together with the feedstocks into the extruder. Volatiles may include gases other than air. Due to the pressures in the extruder, the volatile constituents may be distributed in the molten or plasticized extrusion material and, even in the melt. Gases can also be generated by evaporation of certain fractions of the extrusion material. The gases may have already separated from the melt.

In modern extruders usually an extruder section/module is assigned to each zone. This means that these extruders consist of sections/modules. In the sense described above, the sections are recognizable by a housing length adapted to the processing line, i.e. by different housing lengths. A modular extruder preferably has housings of the same length.

Each housing is provided with a flange at each end so that each housing can be connected to its adjacent housing by a flange. Clamping screws are usually used for clamping. The corresponding openings for the clamping screws are then provided in the housing flanges.

If a housing also forms a nozzle at the discharge, this housing is only provided with a flange at one end, i.e. at the end facing the other housings. However, if no nozzle is provided at the discharge end of the extruder, it may be economically advantageous to use a housing with a flange at each housing end on the discharge side, although the discharge side housing flange has no fastening function. For a modular extruder with identical housings for all planetary roller extruder modules, the economic advantage is ensured as no special production is required for the discharge side housing.

The housings attached to each other usually surround screws or central spindles that extend through all modules. This means that the single-screw extruder composed of sections/modules has one single screw extending through all sections/modules.

The twin-screw extruders composed of sections/modules have intermeshing screws that extend through all modules.

The planetary roller extruders have a central spindle extending through all modules. The planetary roller extruder section/module also includes the planetary spindles rotating around the central spindle and the housing internal toothing. The end of the planetary spindles facing the extruder discharge (rear end in extrusion direction), slides against a thrust ring which is held in the housing. Usually, the length of the planetary spindles is limited to the respective section/module.

In special designs, a module has two or more mutually aligned housings with inner toothing; the said housings are interconnected so that excessively long planetary spindles can extend through more than one housing.

Extruders in mixed design exist in particular as a combination of planetary roller extruder sections/modules with filling sections/modules that are designed as single-screw extruder sections/modules. In this extruder design, the filling section/filling module is provided with a spindle extending through the entire housing. This spindle continues to extend as central spindle into the area of planetary roller extruder modules.

The degassing of the melt is indispensable for the processing of various materials. Degassing is of greatest importance in the production or processing of plastics, in particular of polymers and copolymers. As an example, reference is made to the following publications: DE112009001885T, DE112007002171T, DE112005002824T, DE102013204312, DE102013108369, DE102013101997, DE102013007132, DE102013006667, DE102013000596, DE102012217383, DE102012217383, DE102012212675, DE102012208778, DE102012202005, DE102012107430, DE102012100710, DE102012022346, DE102012020011, DE102012019908, DE102012008169, DE102012005450, DE102011102923, DE102011088959, DE102011083988, DE102011082441, DE102011076993, DE102011076257, DE102011050314, DE102011011202, DE102011011202, DE102011007425.

The more difficult the manufacturing process or the processing method, the greater the importance of degassing. During degassing, gaseous components affecting the production or processing of the materials or their quality are removed. This especially applies to thin films and, even more to transparent films/material layers. In thin films/material layers, even the smallest inclusions appear as bubbles. Due to smallest inclusions/bubbles, thin films and similar layers can already be rejected.

Therefore, degassing of polymers and copolymers has been standard in the processing of polymers and copolymers for a long time. As an example, reference is made to the description in the following publications: WO2015189326; WO2013037685; WO2009138402; WO2006108744; WO2005047391; WO2005042639; WO03020823; WO0118148; WO2009090119; WO050504; WO9942276; EP0080665; DE19815120.

Degassing takes place on the extruder, in the simplest case through an opening in the housing, above, the opening being at atmospheric pressure. If the melt pressure in the extruder is slightly higher than the pressure at the housing opening, melt also escapes. The melt is then collected in a dome/container above the housing opening. The efficiency of such degassing is low. It is better if a vacuum compared to the extruder interior is applied to the housing opening. Due to the pressure difference between the externally applied vacuum and the pressure in the extruder interior results in a significant better degassing. It is known to apply a vacuum to the outside of the opening, cf. for example DE202016101935U, DE202010017571U, DE102014016380, DE102013225178, DE102011112081, DE102006001171, DE102008012185, DE10066229, DE10054854, DE10048028, EP2801461, WO2009000408.

For an expert, the term "vacuum" means the highest possible negative pressure under economic conditions compared to the ambient pressure. It is usually still economical to apply a negative pressure of less than/equal to 20 mbar, even of 10 mbar. The application of a negative pressure of 5 mbar, even the application of a negative pressure of 1 mbar is also known.

It has already been established in the past that degassing also depends on the location where the degassing opening is located. In a planetary roller extruder, the conditions are very favorable if the opening is close to the thrust ring or in the thrust ring, on the side away from the sliding surface of the planetary spindles. The thrust ring can be in one or multiple parts and also ensure other functions than a mere thrust ring.

SUMMARY

An object of the present disclosure is to provide a planetary extruder with improved degassing characteristics. This object is accomplished by an extruder for producing and processing polymers and polymer mixtures, including a planetary roller degassing section. The extruder includes a housing and a bushing arranged within the housing, the bushing having an internal toothing with a pitch diameter and a root circle. An externally toothed central spindle is arranged within the housing. Planetary spindles are configured and disposed to rotate about the central spindle between the central spindle and the bushing while intermeshing with the toothing of the central spindle and the toothing of the bushing. A heat transfer fluid is guided through fluid channels which extend helically along an outer surface of the bushing and guide the heat transfer fluid axially. A degassing opening is provided to which a negative pressure is applied for degassing. A minimum radial thickness (t) of the bushing between the root circle of the internal toothing on an inside of the bushing and a bottom of the fluid channels on an outside of the bushing is selected based on the pitch diameter (d) of the internal toothing.

The disclosure is based on the recognition that the following elements are important for degassing:

Knowledge which volatile constituents are to be degassed,
whether the volatile constituents in the molten or plasticized extrusion material are dissolved or only distributed,
at which temperature degassing is performed,
at which temperature other essential parts of the extrusion material have to be degassed,
ductility of the extrusion material,
at which differential pressure other parts of the extrusion material are substantially carried away,
quantity to be degassed, and
available degassing power.

For effective degassing at least one degassing module in the design of a planetary roller extruder includes a housing which is internally provided with a bushing which is provided with internal toothing on the extrusion material side, intermeshing with planetary spindles rotating around a central spindle.

A planetary roller extruder is similar to a thin film gasifier in that molten or plasticized material can be thinly rolled between the planetary spindles, the internally toothed bushing of the housing, and the externally toothed central spindle. The result is a thin layer of extrusion material of the same, predetermined and small thickness. The constant deformation of the extrusion material in the planetary roller extruder releases trapped or dissolved gases in a very advantageous manner, so that they can escape or be removed.

Furthermore, the planetary roller extruder offers an advantageous temperature control if a temperature control (cooling/heating) is provided at least between the bushing and the surrounding housing. The temperature control is based on a tempering fluid being guided in channels which extend helically (like threads) on the bushing surface and also guide the tempering fluid in the bushing axial direction. More accurate temperature control improves degassing characteristics of a planetary extruder degassing section.

Bushings having the following material thickness in millimeters at the very bottom between the teeth of the internal toothing and the tempering fluid depending on the size of the extruder are beneficial:

| Size | Material thickness | Preferred material thickness |
|------|--------------------|------------------------------|
| 70   | less than/equal to 4.5 | less than/equal to 3 |
| 100  | less than/equal to 4.5 | less than/equal to 3 |
| 150  | less than/equal to 5   | less than/equal to 3.5 |
| 180  | less than/equal to 5.7 | less than/equal to 3.6 |
| 200  | less than/equal to 5.6 | less than/equal to 3.6 |
| 250  | less than/equal to 5.7 | less than/equal to 3.7 |
| 280  | less than/equal to 6   | less than/equal to 4 |
| 300  | less than/equal to 6   | less than/equal to 4 |
| 400  | less than/equal to 6.5 | less than/equal to 4.5 |

The pitch circle diameter of the internal toothing in the housing/bushing is considered as size. The above dimensions should apply both if the channels are incorporated in the housing inner wall, and if the channels are incorporated in the bushing outer surface. Then it depends on the smallest distance between the very bottom of the teeth and the very bottom of the channels.

Extremely thin bushings can be produced using a spark erosion technique in the production of internal toothing, as described in DE102013000708, DE102012006169, DE102010026535, DE102009059912, DE102007050466, DE102004048440, and DE10354172.

Preferably, the bushings are provided with grooves on the outside. Spark erosion can be used to provide the bushings, as well as the internal toothing, with the channel-forming grooves. However, if the grooves are made before the internal toothing, the grooves on thin-walled bushings can also be incorporated on a lathe or milling bench.

In the channel-forming grooves, the tempering fluid flows from one end of the bushing to the other end of the bushing. As internal toothing, the grooves preferably extend with a pitch to the bushing central axis. The pitch of the grooves may be identical to the internal toothing. However, the pitch may be greater or smaller. The grooves may also run in the opposite direction to the internal toothing of the bushing.

In the case of the channels machined into the bushing outer surface, the protruding thickness indications refer to the smallest material thickness between the very bottom of the grooves/channels provided on the outside of the bushings and the very bottom between two teeth of the bushing internal toothing.

Housings with a smooth inner bore for receiving the bushings correspond to the externally grooved bushings. After installing the bushings in the housing, the grooves are closed on the outside, resulting in closed channels. Installation is preferably carried out by shrinking the housing on the bushings.

Having thin bushings supports precise temperature control. They shorten the heat flow so that the temperature of the extrusion material to be degassed can be controlled faster and, thus more accurately. For temperature control, it is also beneficial that a great number of channels wind along the bushing outer surface. This allows the bushings to be kept at a uniform temperature. The greater the amount of heat to be transported, the greater the difference in temperature between the tempering fluid and the extrusion material in the extruder is selected. Furthermore, it is possible to influence the temperature control by adjusting a flow rate of the tempering fluid.

With the described temperature control it is also possible to comply with small temperature windows for producing and processing the polymer mixture. In addition, it is possible to use temperature control in any location for generating a processing-friendly state of the extrusion material. In this sense, it may be reasonable to increase and/or decrease the temperature once or several times within a production or processing window. This particularly applies to polymers with low, temperature-dependent ductility. E.g. the temperature may then be reduced in the area of a seal to increase ductility. On the other hand, to reduce ductility, temperature can be increased in another area with the desired high reactivity of the extrusion material.

If possible, water is preferably used as the tempering fluid. Oil is used at higher temperatures, when water is no longer suitable as tempering fluid.

A temperature change of the extrusion material in the degassing zone is preferably taken into account in that several temperature control devices in the extrusion direction of the planetary roller extruder are arranged one behind the other over the length of the degassing line in the degassing zone. For this purpose, the temperature control channels leading from one end of the degassing zone to the other end of the degassing zone can be divided into individual channel sections and each channel section is assigned its own heating/cooling device so that the different channel sections can be provided differently with tempering fluid. It is possible to work with a different desired temperature in each section. For temperature control with water, each of the temperature control devices is provided with its own water circuit. If oil is used for temperature control, each section has its own oil circuit.

Optionally, the cooling is used, to cool down the entering extrusion material of low ductility (e.g. with a behavior similar to water) to increase its ductility. Increasing ductility reduces the degassing capacity of the extrusion material. However, the inventor has recognized that, with horizontally arranged planetary roller extruder and water-like state of the extrusion material with the planetary roller extruder, no pressure can be exerted on the extrusion material, allowing a sufficient pressure difference for economic degassing. Friction with the planetary roller extruder and the polymers is then too low to generate a significant conveying effect, resulting in an appropriate pressure of the extrusion material.

The pressure in the extruder is increased preferably to at least 1 bar overpressure, even more preferably to at least 2 bar and most preferably to at least 3 bar overpressure in this case through the cooling of the extrusion material and the resulting increase in ductility.

With such an overpressure, degassing takes already place if only the gas is given the opportunity to escape through a degassing opening.

Degassing can be significantly increased, if a negative pressure is applied to the outside of the degassing opening. This may result in different situations. At relatively high pressure in the extruder, the gas is given an opportunity to escape from the degassing extruder with the help of an idling side-arm extruder while the side-arm extruder retains the molten or plasticized extrusion material in the extruder.

Such side-arm extruders are preferably designed as twin-screw extruders and described e.g. in WO2017001048, DE 102012008169, DE102006001171. WO2017001048, DE 102012008169, and DE102006001171. Insofar as the function of the idling twin-screw extruder is limited to pushing back the molten or plasticized extrusion material, very short screws can be used, e.g. screws having a length of max. 150 mm, preferably a length of max. 100 mm and even more preferably a length of max. 50 mm.

The side-arm extruder is of great benefit for degassing in the wetted area of the bushing. The side-arm extruder may also be advantageous in an area where no molten or plasticized extrusion material is pushed to the outside.

The side-arm extruder can also work at an internal pressure higher than 3 bar in the extruder, even at a low degree of filling of the extruder, which is advantageous for degassing.

It is also advantageous if the cavity of the planetary roller extruder/planetary roller extruder section/module is increased by reducing the number of planetary spindles. This is achieved by removing one or more planetary spindles and a new uniform distribution of the planetary spindles on the circumference of the central spindle. It is preferable to remove so many planetary spindles that at least a distance of 1D, preferably of 1.5D and even more preferably of 2D is achieved. By reducing the number of planetary spindles, the conveying effect of the planetary roller extruder/planetary roller extruder section/module is reduced. Likewise, the conveying effect of the planetary roller extruder/planetary roller extruder section/module is reduced by exchanging the normally toothed planetary spindles by planetary spindles with interrupted toothing or partially removed toothing. The very well-known planetary spindles with interrupted teeth are the zoned helical flights and the back-cut spindles.

The zoned helical flights are created by providing normally toothed planetary spindles at intervals with annular recesses in the planetary spindles. The back-cut spindles are created after normal toothing of the planetary spindles, if the planetary spindles are provided with an opposite toothing.

The best known planetary spindles with partially removed teeth are the transport spindles. The transport spindles can also be made from normally toothed planetary spindles by removing one or more teeth in the longitudinal direction from the planetary spindles. At least one tooth is completely retained. Preferably, at least three teeth which are uniformly distributed on the circumference will be retained. The transport spindles can also be machined according to a pattern described above, e.g. by contour-milling. Multi-stage production can also be considered, e.g. by rough milling and subsequent grinding for fine machining or by spark erosion.

With degassing according to the invention, the extruded material to be degassed can be introduced into the extruder at a location which is normally used for feeding the feedstock. If the filling of plasticized or liquid extrusion material takes place against an internal pressure in the extruder, a pump is used to push the melt into the planetary roller section/module. The pump pushes the molten or liquid extrusion material in the direction of the extruder discharge. Usually, the planetary roller extruder/section/module also delivers in the direction of the discharge. The conveying effects then add up.

With the design according to the invention, different flows superimpose themselves in the extruder. The planetary spindles rotating around the central spindle generally cause a flow circulating around the central spindle, and, generally, a flow in the longitudinal direction of the central spindle and along the central spindle. The pump generates a flow in longitudinal direction along the housing inner wall. Furthermore, there is a turbulence of the extrusion material around the planetary spindles. This results in an extreme exchange of the extrusion material in all areas of the extruder. As a result, the extrusion material is given much opportunity for degassing.

After the partial filling of the extruder it is at the discretion of the operators, which amounts of molten or plasticized/liquid feedstock are introduced and removed. The lower the introduction and removal of extrusion material, the longer the extrusion material remains in the extruder and the longer the degassing, resulting in a stronger degassing.

The side-arm extruder may be placed at various locations of the extruder, even in an intermediate section between two adjacent extruder modules.

The side arm extruder includes in its denomination an indication of its lateral location on the planetary roller extruder section/module. It may be advantageous to place the side-arm extruder, contrary to its denomination, perpendicularly to the planetary roller extruder section/module or inclined on the planetary roller extruder section/module. This makes it easier to retain the molten or plasticized extrusion material which is surging outwards.

At low pressure in the extruder compared to the ambient pressure, a sufficient degassing can take place even without side-arm extruder. A negative pressure/vacuum can be applied to the extruder to generate the necessary differential pressure. The negative pressure may be what is conventionally understood by vacuum, namely an economically representable negative pressure down to 10 mbar or down to 5 mbar. Depending on the overpressure in the extruder, a negative pressure of 0.5 bar or 0.8 bar compared to the ambient pressure may be sufficient. At such a negative pressure, the contribution of the induced draft is essentially limited to the removal of already leaked gas.

If the differential pressure comes close to the limit, implying the risk that molten or plasticized/liquid extrusion material is carried away by the escaping gas, it is advantageous to use an intermediate degassing container/dome for degassing. Such containers are described above. It is advantageous that the provided degassing lines are isolated and possibly heated to prevent clogging of the degassing lines by precipitating molten or plasticized extrusion material.

For degassing without side-arm extruder, it is advantageous to arrange the degassing opening in the extruder in an area of the planetary roller extruder where contact to the extrusion material is limited to the minimum. In particular, the inlet side in the planetary roller extruder is such an area. Typically, a cavity is generated there as planetary roller extruders are not filled to 100%. Degrees of filling of 70 to 90% and less are described in WO2013159801.

The gas is at least partially drawn off against the extrusion direction in the extruder. This is called backward degassing. It is advantageous if the gas can be drawn off via a ring construction which is arranged between two adjacent module ends/housing ends. At this point, a line can be easily routed to the ring construction, which allows the gas to escape or to be drawn off.

The ring construction is provided with degassing openings which are connected via internal channels to the line which allows the gas to escape or to be drawn off. If a different planetary roller extruder section/module is arranged upstream in the extrusion direction for degassing a defined extruder section/module, the ring construction for degassing can advantageously be combined with the thrust ring of the upstream planetary roller extruder section/module. It may also be sufficient to place the ring construction for degassing to the thrust ring of the upstream planetary roller extruder section/module.

For backward degassing, a vertical or inclined arrangement of the degassing section/module designed like a planetary roller extruder is also suitable. Then, even with water-like, flowing feedstock and low conveying effect of the planetary parts of the degassing section/module, a cavity is formed at the upper end of the degassing section/module where the gas to be removed can escape and the gas to be removed can be drawn off. In a vertical arrangement of the extruder, the outlet end points vertically downwards. Then a central, upwards open cavity is formed where the gas collects and the gas can escape or be drawn off upwards, which is very advantageous. The cavity can be made larger or smaller by changing the degree of filling, i.e. by supplying more or less feedstocks. The larger the cavity, the easier it is to apply a greater negative pressure to the degassing section/module.

The vertical extruder is preferred as degassing extruder where backward degassing is to take place. For details on vertical planetary roller extruders, reference is made to DE10048028, DE3725641.

If the vertical extruder cannot be used due to its height, an inclined extruder may be suitable as degassing extruder.

As an alternative to backward degassing, a degassing opening can be incorporated into the housing/extruder envelope in a known manner at the housing locations which are located in the area of the gas accumulation in the extruder. However, this means more time and effort due to the noticeable intervention in the temperature control in the extruder housing/extruder envelope.

When applying negative pressure for degassing, a seal is provided at all leakage locations, preventing the intake of ambient air. Preferably, a liquid seal is used as seal. The liquid seal is based on the insight that the sealing gap can be sealed well using a viscous lubricant against air and other gases as well as against easily flowing liquids. When sealing shafts and axles, e.g. two rings/stuffing boxes being spaced from one another are provided on the shafts and axles in the surrounding bores, the space between the rings/stuffing boxes being filled with the viscous lubricant. Optionally, an annular spring can be used at the same time to exert pressure on one of the sealing rings/stuffing boxes, ensuring constantly the complete filling of the gap by the viscous lubricant. For this purpose, the sealing ring/stuffing box arranged towards the extruder interior is preferably rigid and the other, spring-loaded sealing ring/stuffing box is resilient.

Extrusion material is used to generate a seal preferably towards the extruder outlet if a vacuum is applied externally to the planetary roller extruder. This is done by accumulating the extrusion material in front of the thrust ring. The blocking effect is influenced by the design of the planetary spindles. Planetary spindles with low conveying effect can only build up low pressure; on the other hand, planetary spindles with high conveying effect can build up a higher pressure.

As planetary spindles, normal/standard spindles are toothed continuously from one end to the other. Other planetary spindles show recesses. Depending on the design of the recesses, there is a high impact on the transport efficiency of the planetary spindles. Zoned helical flights have circular recesses on the spindles. This reduces the transport effect, but increases the mixing effect of the spindles and the dwell time of the extrusion material in the extruder.

A drastic reduction in the transport effect is ensured by the back-cut spindles. The drastic reduction of the transport effect is accompanied by a much greater mixing efficiency and dwell time of the extrusion material in the extruder.

Back-cut spindles are double-toothed spindles where one toothing runs opposite to the other toothing. Due to this processing, there are only remain only nubs on the spindle core. The transport effect in so-called transport spindles is different. Regarding the details of the transport spindles, reference is made to DE102006033089 and EP1844917.

Depending on the nature of the extrusion material, the transport effect of the transport spindles is increased or reduced.

If applicable, in case of an insufficient transport effect on the extrusion material, a desired accumulation upstream the outlet of a planetary roller extruder module is achieved by using an additional retention ring. The additional retention ring is arranged so that its retention surface is located in the extrusion direction downstream the contact surface on the thrust ring. So, the retention ring cannot hinder the planetary spindles when rotating around the central spindle. The retention ring can be part of a ring construction, forming at the same time the thrust ring and the retention ring. For this purpose, e.g. a thrust ring with an inner collar is suitable, which is offset against the thrust surface on the thrust ring in the extrusion direction.

The retention ring may also be a separate component, which rests in the extrusion direction behind the thrust ring or on the thrust ring and is located, together with the thrust ring between the housings of two adjacent planetary roller extruder sections/modules. Advantageously, such rings and ring constructions can be easily clamped between the housing ends of two abutting/opposing planetary roller extruder sections/modules.

The retention ring leaves, both in the one-piece construction with the thrust ring and in the construction with separate thrust ring, a gap to the central spindle that gives such a resistance to the flow of extrusion material that the desired pressure and the desired layer of material builds up upstream the thrust ring, preventing the passage of air or gas.

The retention ring may also be a ring sitting in a groove of the central spindle, with its retention surface in the extrusion direction downstream the thrust surface of the thrust ring. With the thrust ring, the retention ring then forms a similar gap as in the previously described retention ring arrangement.

Preferably, a multi-piece, e.g. two-piece retention ring is used, which can be put together around the central spindle during assembly if the central spindle is already installed in the extruder.

The jam of extrusion material can be increased very effectively by a vertical or very inclined arrangement of the planetary roller extruder module intended for degassing. The tip of the extruder points downwards. Then, so much extrusion material collects upstream the thrust ring even with a low conveying effect that this extrusion material forms a liquid seal against a downstream extruder section in the extrusion direction.

For the use of a planetary roller extruder for degassing, it is known from DE102006001171 to select the number of planetary spindles rotating around the central spindle so that it is less than the maximum number of planetary spindles. This results in the following numbers of planetary spindles:

| Size | Number of planetary spindles | Module length |
|---|---|---|
| 70 to 100 | 6 to 8 | up to 700 mm |
| 120 to 170 | 8 to 10 | up to 1000 mm |
| 180 | 9 to 11 | up to 1000 mm |
| 200 | 10 to 12 | up to 1000 mm |
| 250 | 13 to 15 | up to 1000 mm |
| 300 | 17 to 19 | up to 1000 mm |
| 400 | 23 to 25 | up to 1200 mm |

The pitch circle diameter of the internal toothing in the planetary roller extruder housing is designated as size.

The number of planetary spindles compared to the above-mentioned number of planetary spindles can be reduced by up to 10%, preferably by up to 20% and even more preferably by up to 30%, and most preferably to three planetary spindles. For the planetary spindles, a uniform distribution on the circumference of the central spindle is important with a reduced number of planetary spindles.

The number of planetary spindles reduced according to the number of planetary spindles results in a significant enlargement of the cavity in the extruder. With a constant quantity of extrusion material in the extruder, a larger surface is achieved, allowing the gas to escape. This increases the degassing performance.

It is also possible to achieve a greater surface and a higher degassing performance by increasing the length of the degassing module. The length of the degassing module can be increased as it is also easily possible to use the above-described spark erosion technique to manufacture internal toothing for excessively long planetary roller extruder modules. When using the conventional technology drawing the internal toothing, the internal threads are getting worse with increasing length. In practice, this technology can only be used to manufacture short planetary roller extruder sections/modules of sufficient quality.

Longer degassing lines can be made up using short planetary roller extruder modules by putting together several modules. The bushings of the modules can be aligned with the toothing so that an excessively long planetary spindle can mesh simultaneously with the internal teeth of a bushing and with the internal teeth of the other bushing. It is then preferably used that the internal toothing of the bushings has a whole number of teeth (on the inner surface of the bushing, whole teeth are arranged side by side on the circumference, running in parallel to each other from one bushing end to the other bushing end). In order to ensure a proper engagement of the planetary spindle in the internal toothing of adjacent bushings, the bushings are brought to a certain distance ensuring that the planetary spindles engage simultaneously in the teeth of both bushings. Based on the same position of the bushings in the module housings, the distance can be calculated from the pitch of the teeth and their dimensions.

The distance can also be determined empirically, for example first, by installing the central spindle on the extruder drive, then by installing the first housing in the extrusion direction together with its bushing of the planetary roller extruder modules for degassing, then by pushing the next (second) housing with its bushing in the extrusion direction over the central spindle and aligning it with the clamping screw openings in its housing flange to the clamping screw openings in the adjacent flange of the previously installed housing then by pushing a planetary spindle (preferably more planetary spindles uniformly distributed around the central spindle) between the central spindle and the second housing with its bushing until the planetary spindle abuts the bushing of the second housing then by spacing the last installed housing by turning the planetary spindle and maintaining the above orientation of the previously installed (brought to a distance) until the planetary spindle engages in the internal toothing of the bushing of the first housing. The resulting distance is decisive for the production of an intermediate piece between the two housings/bushings. The distance determines the axial length of the intermediate piece. In case of subsequent installation of the intermediate piece and the above-mentioned alignment of the second housing, the planetary spindles can be easily pushed through the gap between the central spindle and the second installed housing in the gap between the central spindle and the first installed housing. This is done with simultaneous engagement in the outer toothing of the central spindle and in the internal toothing of the housing bushings.

In another example, the last installed (second) housing with its bushing can be brought to a desired distance from the previously installed (first) housing and then rotated around its center until the planetary spindle engages in the internal toothing of the bushing of the first housing. Then the selected distance between the housing bushings is also decisive for the production of the intermediate piece. During installation, however, the second housing with its bushing must be brought into the same rotational position that has previously been determined. The clamping screw openings in the housing flanges are then designed for this rotational position of the second housing relative to the first housing.

In both examples, the intermediate piece can surround the rotating planetary spindles without toothing. The intermediate piece may be internally toothed like the bushings and bridge the gap between the two bushings, achieving a tooth length as in a one-piece bushing where the two housings described above are shrunk.

In all examples with calculated axial length of the intermediate piece as well as empirically determined length of the intermediate piece, the housing flanges are clamped together at the opposite ends of both housings on the flanges after assembly of the intermediate piece and after installation of the second housing with bushing so that the intermediate piece is clamped between the opposite housing ends.

According to the invention, it may be useful to shrink to module housings on an excessively long bushing. This can be done with or without intermediate piece. The intermediate piece would then preferably have the task of protecting the bushings in the gap between the shrunk-on housings against bending loads and other loads.

Several degassing locations are preferably provided over the degassing line. The same or different degassing can be used. The first degassing in the conveying direction of the extrusion material may e.g. be the above-described degassing at low differential pressure with a negative pressure/vacuum applied externally to the extruder. The subsequent degassing may be a degassing by means of an above-described, idling side-arm extruder, which is installed in an area where pressure build-up has already taken place in the extrusion material.

Multiple degassing may take place on a planetary roller extruder section/module. Multiple degassing can also be distributed over several successively arranged planetary roller extruder modules. Multiple degassing allows progressive degassing to remove the same gas. Multiple degassing can also be used to remove various gases that occur in different processing steps in the extruder. Although several planetary roller extruder modules arranged in a row and in alignment have separate housings and separate bushings forming the internal toothing and, usually, separate planetary spindles, they always have a common central spindle. The common central spindle requires a common rotational movement of all moving parts. Several planetary roller extruder modules arranged one behind the other in the extrusion direction and not in alignment have separate central spindles. Such arrangement results in so-called tandem systems with primary extruder and secondary extruder or in cascade systems if in the extrusion direction other extruders are not provided in alignment downstream the secondary extruder. Both with the aligned planetary roller extruder sections/modules and the sections/modules of a tandem/cascade system, a degassing described above with low pressure gradient including externally applied negative pressure/vacuum and/or, with higher pressures, a degassing described above using an idling side-arm extruder can be used in each section/module.

Optionally, this can also be achieved by using two or more planetary roller extruder modules instead of a long planetary roller module intended for degassing for the repeated application of this degassing technique. In this case, even the blocking effect ensured by the thrust ring may be sufficient to achieve a desired pressure in the extruder.

Degassing as described above can also be combined with a degassing known with tandem systems. The tandem systems consist of a primary extruder and a secondary extruder, which is usually arranged with its inlet end below the outlet end of the primary extruder. It has long been known that the transition from the primary extruder to the secondary extruder is enclosed, and the housing is degassed as the extrusion material exits the primary extruder until it enters the secondary extruder. For this purpose, a corresponding negative pressure is then applied to the housing.

In each of the modules, additional degassing at a location with higher pressure in the extrusion material can take place using a side-arm extruder described above. This can take place once or several times.

The degassing possibilities described above can be used for melt or plasticized extrusion material which is produced in extruder sections which are arranged upstream of the planetary roller extruder section/module intended for degassing. The degassing possibilities described above can also be used for molten or plasticized extrusion material which is produced differently than in upstream extruder sections/modules and is introduced into the extruder section intended for degassing (for example using a pump).

The degassing described above in the planetary roller extruder not only has the advantage of thin rolling the extrusion material, but also the advantage of a special mixture of the extrusion material.

The degassing possibilities described above can be used not only on melt which is introduced in a planetary roller extruder intended for degassing. The use on feedstock consisting of particles that have experienced no heating or only surface heating or have molten only on the surface is also possible. Degassing is also used to remove completely or partially the air or carrier gas entrained when entering the extruder intended for degassing.

Moreover, the degassing can be combined with the degassing of a particle stream which is fed to the extruder from a bulk hopper or by means of compressed air or by means of another gas carrier medium. The invention makes use of a technique as described in DE102015001167 and PCT/

EP2016/000077 and the state of the art listed therein. According to the state of the art, the air contained in the fill in the extruder part used for filling the extrusion material (also referred to as filler part) is withdrawn via filters. Apart from that, the non-pourable fine material (powdered and dust-like particles), which is introduced using compressed air or another gaseous carrier medium, is separated as much as possible from the compressed air and other carrier medium before entering the extruder. In this case, preferably filters and plug screws are used. It is even more preferable that the filters are made of sintered material and the filter surface is formed by a great number of filter discs. A layer of sucked extrusion material is formed on the filter discs; this material is continuously processed by means of the plug screw and fed to the inlet opening of the extruder. The plug screw is preferably a twin screw designed as a twin-screw extruder, as it is also used for side-arm extruders.

Degassing is usually part of the preparation of polymers or polymer mixtures and their processing. In some cases, fillers and various resins and additives and other constituents can be used on a large scale. The batch-wise production in mixers is classical. From the mixer, the polymers and polymer mixtures can be fed to an extruder for degassing and further processing.

It is advantageous to start the production of the polymer mixture already in the extruder. The extruder even allows carrying out several production steps and processing steps on one line. In this case, degassing in the planetary roller extruder should be part of the extrusion line. Part of such an extrusion line is that feedstocks can be added in granular, fine-grained or liquid form. The constituents of the extrusion material can be added individually or in groups as a premix (compound). For the state of the art of polymer processing in the extruder, reference is made to: DE112007002445T, DE112005000058T, DE102015217860, DE102013017927, DE102012207801, DE102011089331, DE102011075313, DE102010038288, DE102009046362, DE102008058537, DE102008019804, DE102008001431, DE102006043259.

The fillers are often fed in solid form into the extruder. Volume metering and/or weight metering are used to add granular solids in bulk. The addition of powdery or dusty substances takes place in the special way described above. The addition of solid substances involves a considerable construction effort on the extruder. It is therefore common to limit the addition of solids as much as possible to the filler part of the extruder. If solid substances still have to be added elsewhere on the processing line, this is preferably done via side-arm extruders. For the construction of the side-arm extruder, reference is made to DE202010017570U, DE102012008169. In particular, the side-arm extruders designed as twin-screw extruders can also feed the solids against the internal pressure of the main extruder.

Liquid materials (e.g. resins/oils or propellants when producing plastic foam or liquid reactants) are injected. Liquid materials can be used for different purposes. The purpose of the liquid reactants is obvious. Excess liquid materials can be removed by evaporation and degassing. The degree of removal depends on the completeness of evaporation as well as on the completeness of degassing.

Evaporation and degassing can be carried out in a planetary roller extruder section/module or multiple planetary roller extruder sections modules. When using several planetary roller extruder sections/modules for evaporation and degassing, at least one separate planetary roller extruder section/module is preferably provided for evaporation. The same applies to degassing. The separate extruder sections/modules facilitate temperature control.

Evaporation and degassing can be carried out in one or more stages. In this case, optionally each evaporation zone and each degassing zone is assigned a separate extruder section/module.

A temperature increase is used for evaporation. The temperature increase can be carried out by supplying heat from the outside and/or by introducing mechanical energy into the extrusion material. The mechanical energy input takes place through the deformation of the feedstock in the extruder.

The liquid feedstock can also be a reaction additive. This should be removed afterwards. To the removal of the liquid reactants applies the same as to the removal of other liquid feedstocks.

Due to a desired reaction in the extruder, a liquid phase can also be formed in the extruder which should be completely or partially removed. To the liquid products to be removed applies the same as to the removal of other liquid feedstocks.

For injection, nozzles in a ring construction forming a unit with the thrust ring or fitting closely to the thrust ring, are preferably used. This has the advantage that the ring construction can be supplied with the liquid materials via a feed line through the gap between the module ends/housing ends abutting one another in the area of the thrust ring via a feed line. The ring construction includes appropriate lines leading from the supply line to the individual nozzle openings. If the need for the liquid materials is obvious already well upstream or well downstream of the module end/housing end, the length of the associated modules can be changed so that the position of the module ends/housing ends is adapted correspondingly and the injection of the liquid materials takes place at least near the right location.

The necessary injection pressure can be achieved in various forms. Pumps are very popular for injection. However, single-screw extruders and twin-screw extruders are also suitable for injection because they achieve high injection pressures. The single-screw extruders and twin-screw extruders also have the advantage that they are able to melt solid plastic particles at the same time. In the case, we also speak of a side-arm extruder. Unlike with pumps, there must be no liquid feedstock for the side-arm extruder. It must be possible to liquefy the material to be fed only in a single-screw extruder or a twin-screw extruder.

Optionally, it is also possible to use pumps which are fed with liquid feedstock by means of a single-screw extruder or a twin-screw extruder.

If there is no appropriate opportunity for injecting liquid components using a ring-nozzle design on the extruder between two extruder sections/modules, a bore is usually provided at the correct location on the extruder processing line. Several bores can be provided and used for injection. If temperature control is disturbed by a bore, another location is preferably selected on the circumference where the bore is placed completely or at least to a large extent within a web between two channels for the tempering fluid.

Degassing can be used for example to
remove trapped air in the extrusion material
remove other trapped gases in the extrusion material
evaporate and remove moisture in the extrusion material
evaporate and remove other unwanted liquid constituents in the extrusion material, e.g. solvents
evaporate and remove unwanted solid materials in the extrusion material
to remove unused reactants/residues and entrainers that have been added previously. An example is polymerization; degassing is used to remove unused monomers.

evaporate and remove separated fractions of chemical compounds. Partly, the separation of a chemical compound can be achieved only by the temperature and intense kneading in the extruder. Partly, separation can only be achieved by using auxiliary agents for this purpose, preferably degassing rings between abutting housings of extruder sections/modules or a degassing ring at the input of a planetary roller extruder section/module serving as degassing extruder section/module are used if degassing is also useful, an idling side-arm extruder is used.

The volatiles in extruded polymer mixtures may be greater than e.g. 5 weight percent of the mixture, whereas only a proportion of 0.2 weight percent or less is acceptable.

The reasons for the necessary reduction in volatiles may vary. They include an increase in product quality prevention of damage to health. A later outgassing will be prevented. To avoid damage to health, the combination with a gas extraction at the extruder outlet may be suitable.

Reduction of costs

Prevention of chemical degradation

Carrying out further processing

The disclosure is applicable to all existing polymers including the thermally crosslinking polymers and their processing. The adhesives industry is one of the industries with major applications of extruders and degassing. This applies particularly to the production of adhesives and adhesive tapes using thermoplastic and non-thermoplastic elastomers, and of rubber, in conjunction with aggregates and processing agents. Likewise for the production of adhesives, also of acrylic adhesives, epoxy glues and urethane adhesives.

The various constituents and processing agents of the adhesives can be added at different locations of the extruder or the extrusion line, also at different locations on each planetary roller extruder section/module. This allows the addition of each constituent to be made at least approximately at the optimum location. The fact that several addition points may exist over the length of the processing line is advantageous. This applies, e.g. to the addition of resins, oils, plasticizers, tackifiers, stabilizers, crosslinking agents, paints, reaction accelerators, as well as to other mixture proportions and processing agents. The additions and addition locations result from the different formulas of the adhesive manufacturer.

Beyond the degassing extruders, the production and processing means particularly include:

Silos and other storage facilities for solids,
Containers for liquid and gaseous materials
Pre-processing installations,
Pre-mixers
Metering devices
Feeders for solids
Injection pumps for liquid materials
Pressure containers with a gas supply for injecting gas
Degassing installations
Suction pipes, suction cables, filters for exhausted gases and combustion equipment for extracted gases
Cooling zones for cooling down the processed extrusion material, in particular the generated melt, to discharge temperature
Post-processing installations e.g. for film production or for production of moulded parts or sandwich products
Post-processing installations e.g. for crosslinking polymers
For adhesive production, filling devices for cartridges, tubes and other adhesive containers
Application devices/coating devices for the application of adhesive on tapes for the production of adhesive tapes, e.g. nozzles and rollers, including an upstream melt pump to a possibly required increase of the melt pressure for adhesive application
Devices for producing films and webs
Winding equipment, packaging equipment, stacking and storage facilities
Granulators The use of the disclosed degassing extruders is not bound to the fact that all or individual production steps or processing steps before degassing are carried out in an extruder and/or that plastic polymers or a plastic polymer mass is transferred from an extruder to the degassing extruders. The disclosed degassing extruders can also be used for any manufacturing and processing methods that are used to process polymers or generate polymers, also in a mixture or as a compound, even plastic or molten.

DETAILED DESCRIPTION

Figure 4:
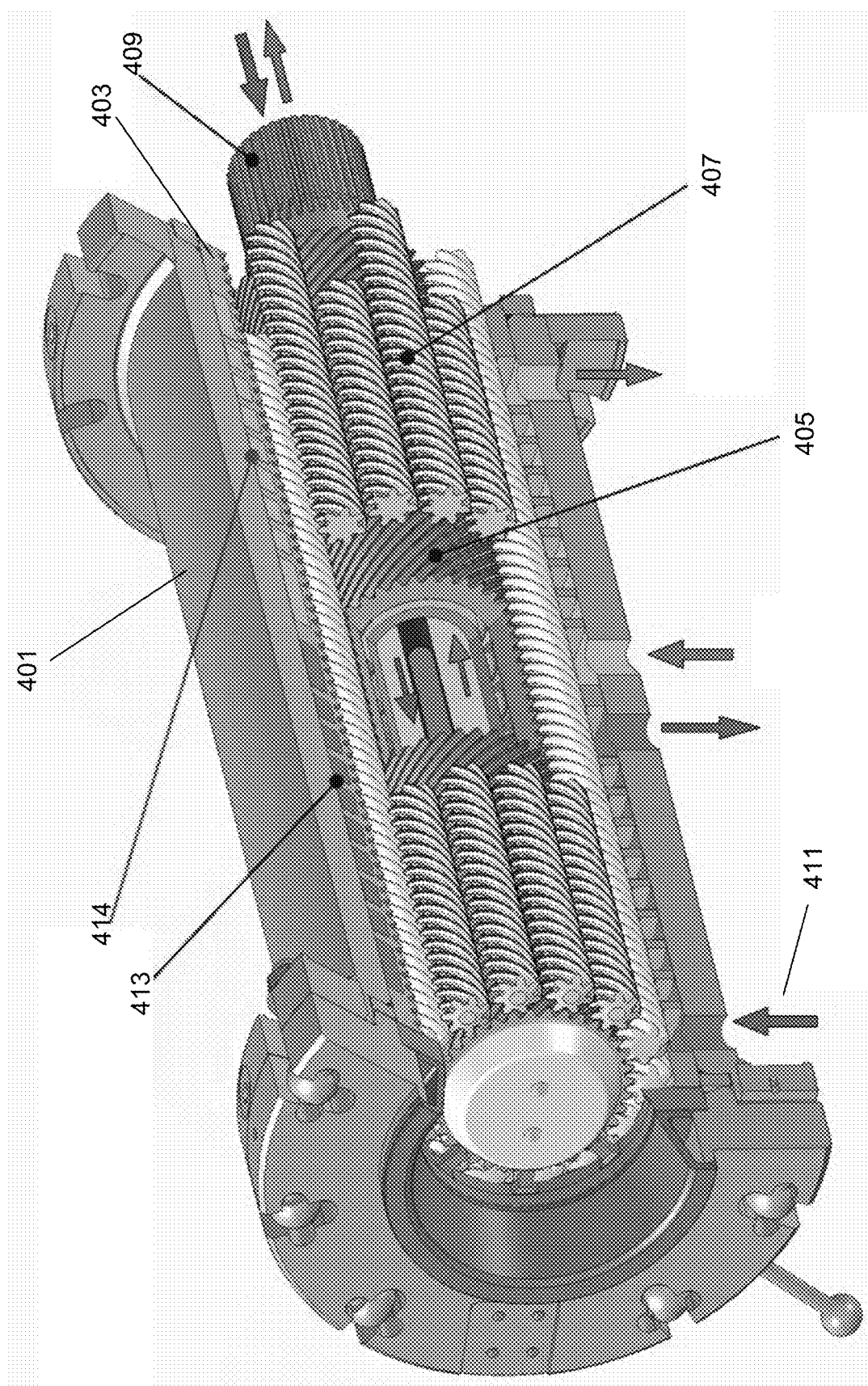
FIG. 4 is a partially cut-open perspective view of a planetary extruder according to the prior art.

Referring to FIG. 4, a planetary extruder generally includes a housing 401. A bushing 403 is arranged within the housing. The bushing 403 has an internal toothing with a pitch diameter and a root circle. An externally toothed central spindle 405 is arranged within the housing 401. The central spindle 405 is connected to a drive (not shown) by a journal 409. Planetary spindles 407 are configured and disposed to rotate about the central spindle 405 between the central spindle 405 and the bushing 403 while intermeshing with the toothing of the central spindle 405 and the toothing of the bushing 403. A heat transfer fluid 411 is guided through fluid channels 413,414 which extend helically along an outer surface of the bushing and guide the heat transfer fluid axially.

Figure 1:
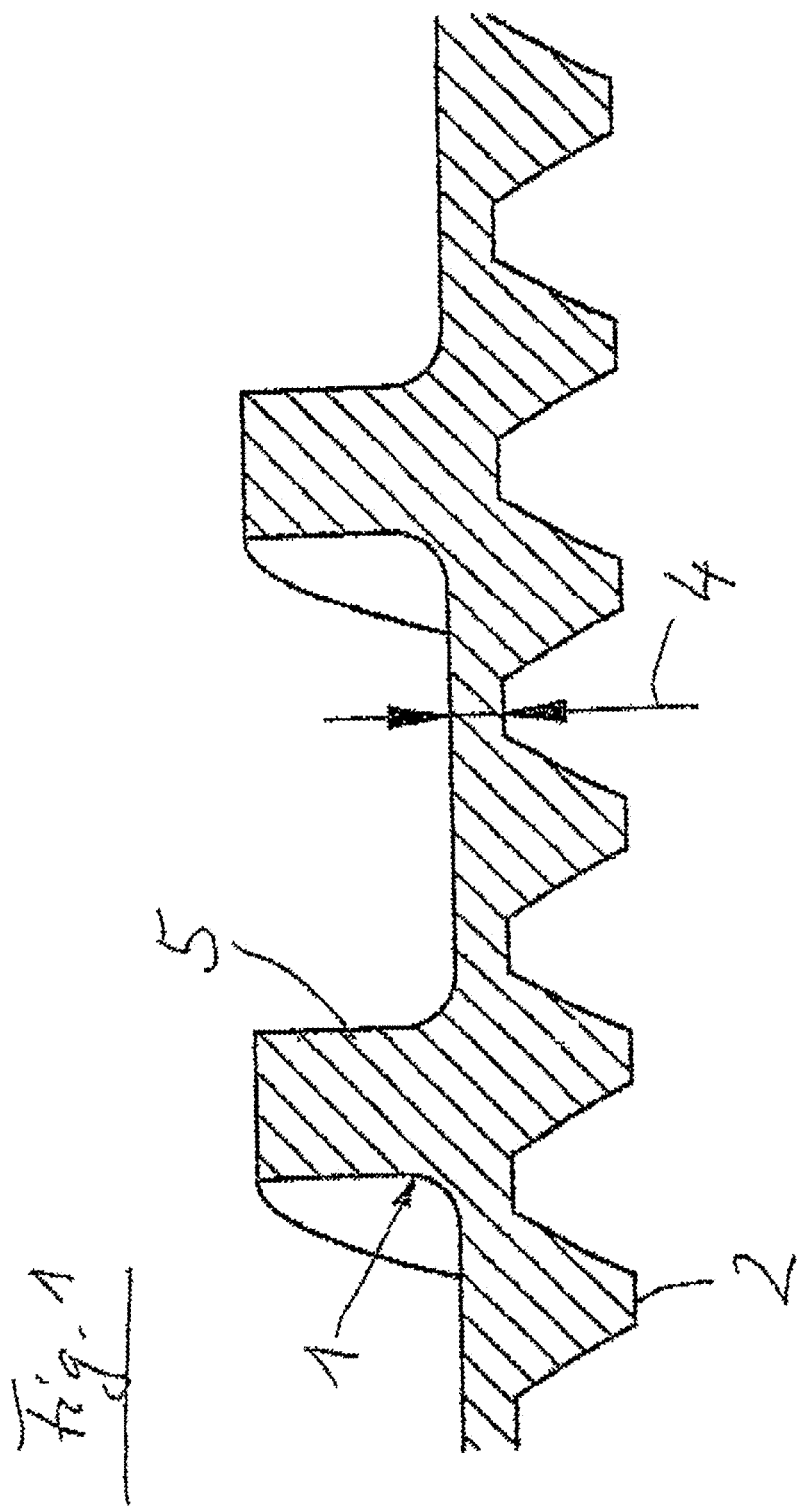
FIG. 1 shows part of a cross section of a bushing for a planetary roller extruder section/module intended for degassing. For simplicity of illustration the round bushing is shown flattened.
Figure 5:
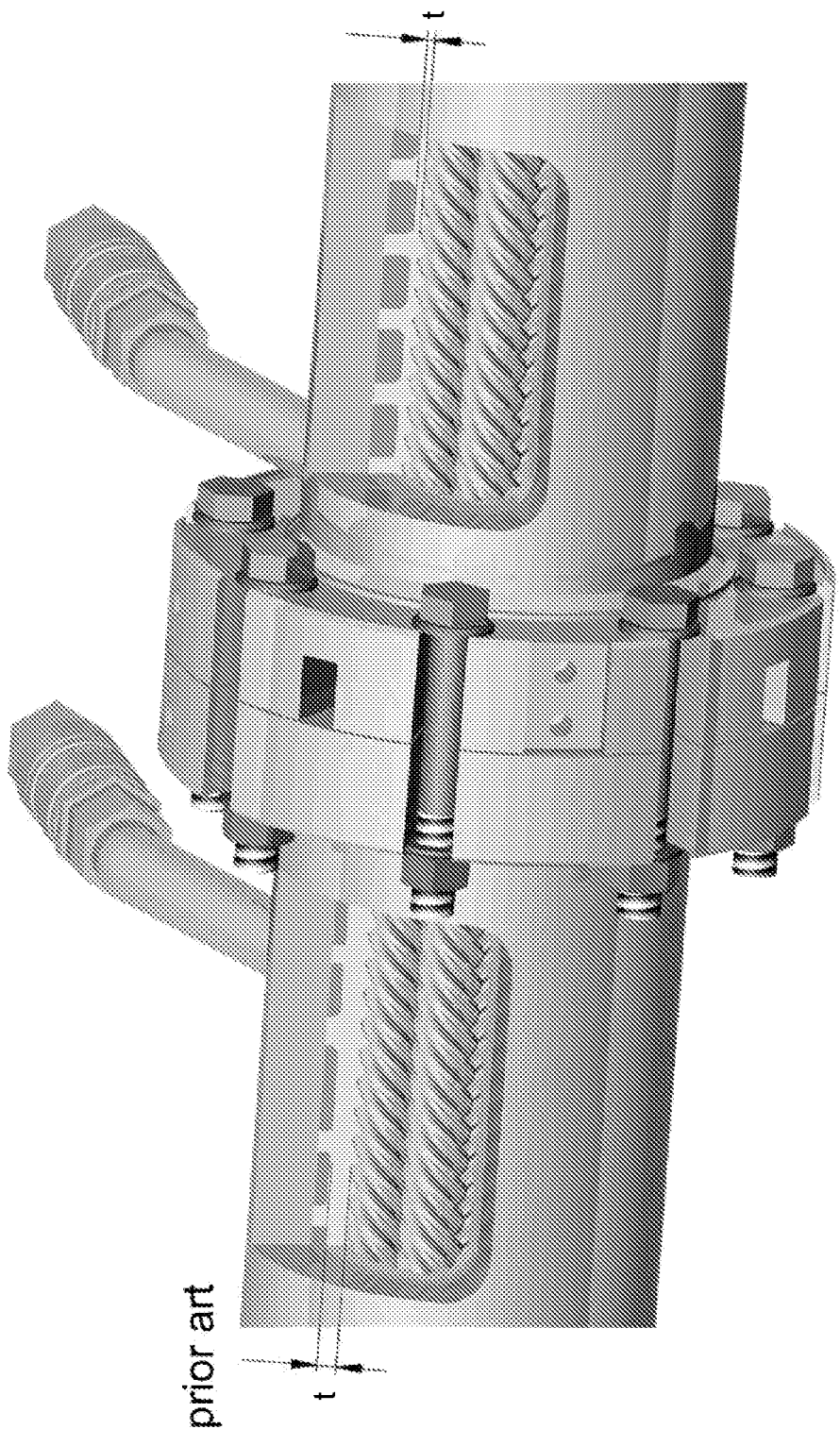
FIG. 5 is a partially cut-open perspective view of a planetary extruder illustrating, on the left side, a prior art configuration of a bushing with fluid channels and, on the right side, a configuration of a bushing having a reduced radial thickness (t) between an internal toothing and fluid channels.

FIG. 1 shows a detail of a bushing 1 for a planetary roller extruder section/module intended for degassing. For simplicity of illustration, the bushing 1 is shown in a flattened and straightened cross section. A toothing 2 is formed on the inside of the bushing 1. On the outside of the bushing 1 recesses/grooves form channels 5. The dimension in the very bottom between the teeth and in the very bottom of the channels is designated as 4. It refers to a minimum radial thickness 4 of the bushing 1 between a root circle of the internal toothing on an inside of the bushing and a bottom of the fluid channels [[3]] 5 on an outside of the bushing. In FIG. 5, it is seen that the prior art radial thickness of the bushing 1 (Prior Art "t") is clearly thicker than the radial thickness "t" of the bushing of the invention seen on the right side of FIG. 5. This reduced radial thickness "t" of the bushing 1 taught by the invention increases heat transfer between the substances being processed and the heat transfer fluid in the fluid channels 5 to avoid deterioration of the substances.

Figure 2:
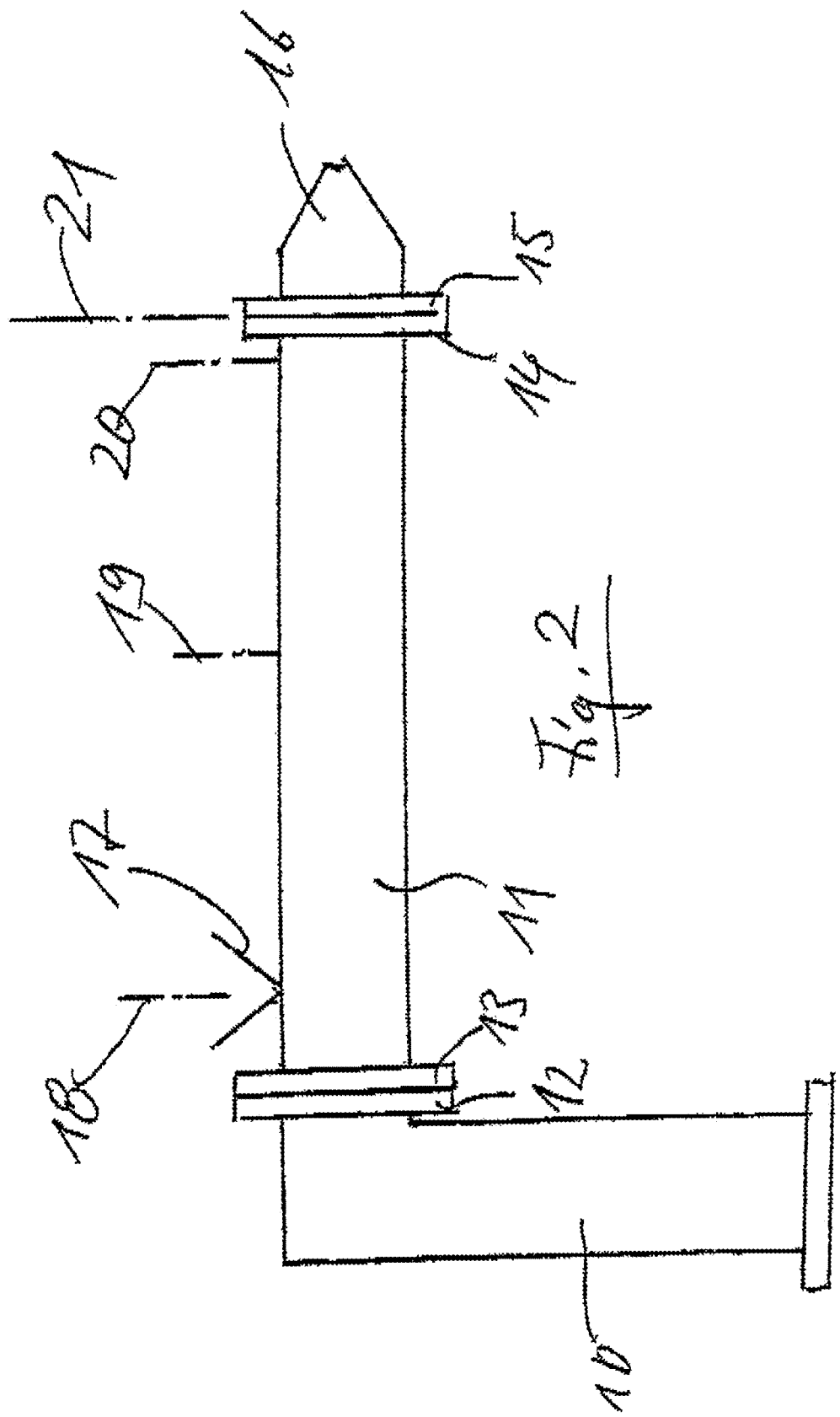
FIG. 2 shows an extruder with a planetary roller extruder section.

FIG. 2 shows an extruder with a planetary roller extruder section 11 designed as a planetary roller extruder, a drive 10 and an outlet 16. The length of the section 11 corresponds to the desired length of the degassing line. The housing of section 11 is provided with flanges 13, 14 on both ends. An upstream flange 13 is used to clamp the planetary roller extruder section 11 to a corresponding flange 12 of the drive 10. A downstream flange 14 is clamped with a corresponding flange 15 of the outlet 16.

In its housing, section 11 is provided with an internally toothed bushing, a central spindle which is set in rotary motion by the drive. In the design example, four planetary spindles turn around the central spindle. The planetary spindles are evenly distributed on the circumference of the central spindle and intermesh both with the external teeth of the central spindle and with the internal toothing of the bushing.

Three degassing points are provided on the housing of the section. A first degassing point 18 is located at the hopper 17. The hopper is encapsulated so that the air arriving with the feedstock in the hopper can be removed.

Degassing further takes place at a second degassing point 19 and a third degassing point 20 by means of side-arm extruders (not shown) located on top of the housing and idling. The side-arm extruders are designed as twin-screw extruders and press back the melt forcing out of section 11. At the same time, a negative pressure is applied to the side arm extruders, which makes it easier for the gas released in section 11 to exit from section 11.

In another design example, a degassing ring (not shown) is provided instead of the third degassing point 20 at the end 21 of the extruder section 11. The degassing ring is located between the downstream flange 14 and corresponding flange 15 of the outlet 16. The two flanges 14, 15 form a common ring construction with the thrust ring for the planetary spindles. The ring construction is provided, on the side facing away from the thrust surface, with degassing openings, which open into an enclosed ring channel connected to a suction line.

Figure 3:
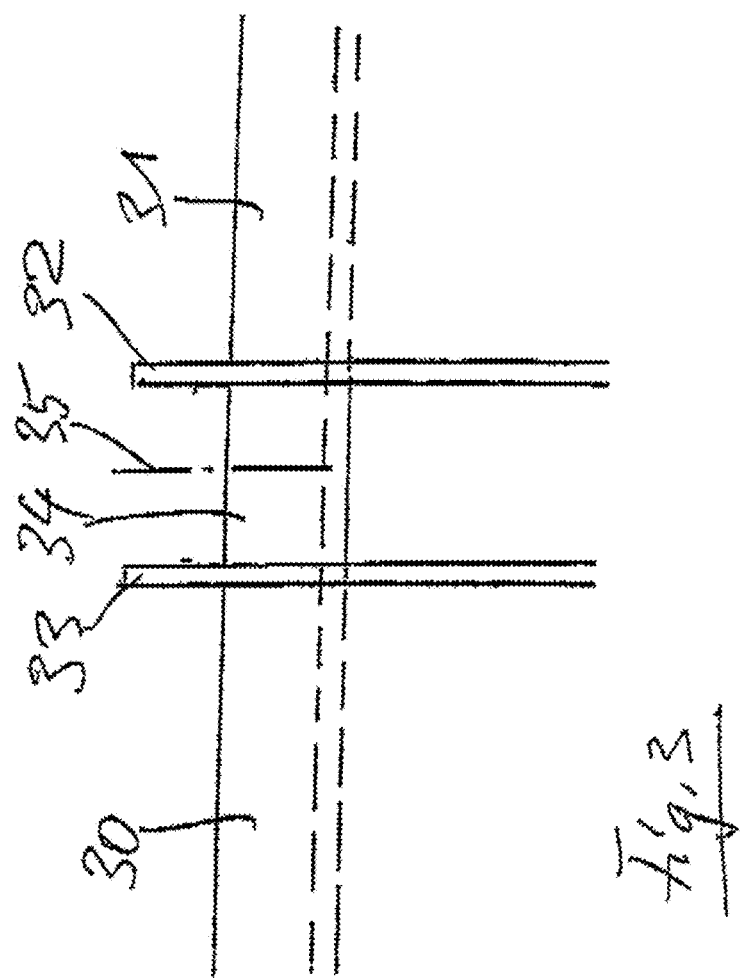
FIG. 3 shows a connection between two extruder modules.

FIG. 3 shows a design example where the degassing section is formed by two planetary roller extruder modules 30 and 31, the housings of which are clamped together at flanges 32, 33, with an intermediate piece 34. The housings 30, 31 are provided with a bushing which is internally toothed and corresponds with the planetary spindles or the central spindle of the planetary roller extruder modules. The toothing of both bushings is the same. In addition, the intermediate piece 34 is provided with the same toothing and dimensioned and arranged so that excessively long spindles protrude through both modules. In a further design example, a degassing point 35 is provided on the intermediate piece 34.

What is claimed is:

1. An extruder for producing and processing polymer-based adhesives and polymer mixture-based adhesives, including a planetary roller degassing section comprising:

a housing;
a bushing arranged within the housing, the bushing having an internal toothing with a pitch diameter and a root circle;
an externally toothed central spindle arranged within the housing;
planetary spindles, configured and disposed to rotate about the central spindle between the central spindle and the bushing while intermeshing with the toothing of the central spindle and the toothing of the bushing;
a heat transfer fluid which is guided through fluid channels which extend helically along an outer surface of the bushing and guide the heat transfer fluid axially; and
a degassing opening to which a negative pressure is applied for degassing, wherein:
a minimum radial thickness (t) of the bushing between the root circle of the internal toothing on an inside of the bushing and a bottom of the fluid channels on an outside of the bushing is selected based on the pitch diameter (d) of the internal toothing according to the following table:

| pitch diameter (d) | minimum material thickness (t) |
|---|---|
| d ≤ 85 mm | t ≤ 4.5 mm |
| 85 mm < d ≤ 125 mm | t ≤ 4.5 mm |
| 125 mm < d ≤ 165 mm | t ≤ 5.0 mm |
| 165 mm < d ≤ 190 mm | t ≤ 5.7 mm |
| 190 mm < d ≤ 225 mm | t ≤ 5.6 mm |
| 225 mm < d ≤ 265 mm | t ≤ 5.7 mm |
| 265 mm < d ≤ 290 mm | t ≤ 6.0 mm |
| 290 mm < d ≤ 350 mm | t ≤ 6.0 mm |
| d > 350 mm | t ≤ 6.5 mm | the extruder comprises fewer planetary spindles than a maximum number of planetary spindles that could be accommodated between the central spindle and the bushing; and
gas is extracted from a cavity formed at an inlet side of the extruder,
whereby the minimum radial thickness of the bushing provides a wall thickness that increases heat transfer between
the polymer-based adhesives or polymer mixture-based adhesives and
the heat transfer fluid in the fluid channels to avoid deterioration of the polymer-based adhesives or polymer mixture-based adhesives during the processing.

2. The extruder as in claim 1, wherein the degassing opening is arranged at a degassing ring on an inlet side of the planetary roller degassing section, the degassing opening being connected via a channel of the degassing ring to a degassing line which leads outwards at a housing end of the planetary roller degassing section.

3. The extruder as in claim 2, wherein an upstream planetary roller section is arranged upstream of the planetary roller degassing section and the degassing ring of the planetary roller degassing section fits closely to a thrust ring of the upstream planetary roller section or forms a common ring construction with the thrust ring.

4. The extruder as in claim 2, wherein a vacuum pressure of less than 10 mbar is applied to the degassing line.

5. The extruder as in claim 1, wherein a liquid seal is provided to prevent leaks between two or more components of the extruder.

6. The extruder as in claim 1, further comprising an idling side-arm extruder arranged outside the housing and connected to the degassing opening in a melt-wetted area of the bushing, wherein the idling side-arm extruder is configured to push melt that has been forced out through the degassing opening back into the planetary roller degassing section.

7. The extruder as in claim 6, wherein the idling side-arm extruder is a twin-screw extruder having screws which are at most 150 mm long.

8. The extruder as in claim 1, wherein a maximum number of planetary spindles (n) is selected based on the pitch diameter (d) of the internal toothing according to the following table:

| pitch diameter (d) | max. number of planetary spindles (n) |
| --- | --- |
| d ≤ 110 mm | 5 |
| 110 mm < d ≤ 175 mm | 7 |
| 175 mm < d ≤ 190 mm | 8 |
| 190 mm < d ≤ 225 mm | 9 |
| 225 mm < d ≤ 275 mm | 11 |
| 275 mm < d ≤ 350 mm | 15 |
| d > 350 mm | 20 |

9. The extruder as in claim 1, wherein the planetary roller degassing section comprises three planetary spindles which are uniformly distributed around the central spindle.

10. The extruder as in claim 1 having an extended degassing section, wherein either
   a) two planetary roller degassing sections are provided with common planetary spindles which extend into both planetary roller degassing sections or
   b) the housing comprises a first housing section and a second housing section which are connected by intermediate pieces and wherein the bushing extends into both housing sections.

11. The extruder as in claim 1, comprising a plurality of degassing openings.

12. The extruder as in claim 1, wherein the planetary roller degassing section is integrated in an extrusion line in which the planetary roller degassing section is aligned with other extruder sections/modules of the extrusion line or wherein in which the planetary roller degassing section is arranged in tandem with other extruder sections/modules of the extrusion line.

13. The extruder as in claim 12, wherein the extrusion line is equipped with a filler part and one or more of
   a) an additional degassing on the filler part,
   b) a gas extraction at an extruder outlet, and
   c) an additional material supply outside of the filler part.

14. The extruder as in claim 12, comprising an additional material supply which is
   a) a solids feed using a side-arm extruder and/or
   b) a liquid supply.

15. The extruder as in claim 12, comprising an additional liquid supply which is
   a) a pump or
   b) an extruder for melting an extrudable solid feedstock.

16. The extruder as in claim 15, wherein the additional liquid supply
   a) takes place through openings which are distributed over a length of the extrusion line on the housing thereof and/or
   b) through a ring construction with at least one opening, wherein the ring construction is arranged between two extruder sections/modules so that supply lines for liquids can be led through a gap between the two extruder sections/modules to the ring construction.

17. The extruder as in claim 15, wherein a ring construction is provided for injection between two extruder sections/modules which fits on a thrust ring located there or which forms a unit with a thrust ring if an extruder section/module located upstream of the ring construction is a planetary roller extruder section/module with thrust ring for the planetary spindles.

18. The extruder as in claim 1, wherein the minimum radial thickness (t) of the bushing between the root circle of the internal toothing on the inside of the bushing and the bottom of the fluid channels on the outside of the bushing is selected based on the pitch diameter (d) of the internal toothing according to the following table:

| pitch diameter (d) | minimum material thickness (t) |
| --- | --- |
| 70 mm | t ≤ 3 mm |
| 100 mm | t ≤ 3 mm |
| 150 mm | t ≤ 3.5 mm |
| 180 mm | t ≤ 3.6 mm |
| 200 mm | t ≤ 3.6 mm |
| 250 mm | t ≤ 3.7 mm |
| 280 mm | t ≤ 4 mm |
| 300 mm | t ≤ 4 mm |
| 400 mm | t ≤ 4.5 mm. |

* * * * *